United States Patent
Tokumiya

(10) Patent No.: US 7,372,189 B2
(45) Date of Patent: May 13, 2008

(54) DRIVING DEVICE

(75) Inventor: Motoyoshi Tokumiya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/603,133

(22) Filed: Nov. 22, 2006

(65) Prior Publication Data

US 2007/0132341 A1    Jun. 14, 2007

(30) Foreign Application Priority Data

Nov. 24, 2005    (JP) .......................... P2005-338945

(51) Int. Cl.
*H02N 2/00* (2006.01)
*G02B 7/00* (2006.01)
(52) U.S. Cl. ..................................... 310/328
(58) Field of Classification Search ............... 310/328
See application file for complete search history.

(56) References Cited

U.S. PATENT DOCUMENTS

2005/0093400 A1*  5/2005  Johansson .................. 310/328

FOREIGN PATENT DOCUMENTS

JP    2002-142470 A    5/2002

\* cited by examiner

*Primary Examiner*—J. San Martin
(74) *Attorney, Agent, or Firm*—Birch, Stewart, Kolasch & Birch, LLP

(57) ABSTRACT

A driving device comprises: an electro-mechanical conversion element enabled to expand and contract in response to input of an electrical signal; a pair of clamping members that come closer to and move away from each other with expansion and contraction of the electro-mechanical conversion element; a moving member disposed between said pair of clamping members; and flagellar members which are provided between the moving member and each of said pair of clamping members to be inclined to a direction in which said pair of clamping members come closer to and move away from each other, and which are adapted to swing when said pair of clamping members come closer to and move away from each other, to cause the moving member to move in a constant direction.

20 Claims, 3 Drawing Sheets

DRIVING DEVICE

BACKGROUND OF THE INVENTION

1. Field of the Invention

The present invention relates to a driving device using an electro-mechanical conversion element.

2. Description of the Related Art

Hitherto, a driving device employing a piezoelectric element (electro-mechanical conversion element), which is used to drive a lens of a digital camera or a camera phone, has been known. Such a driving device is configured so that one of end portions in the expansion/contraction direction of the piezoelectric element is fixed by a platform, and that a shaft-like driving frictional member extending in the expansion/contraction direction of the piezoelectric element is fixed to the other end portion of the piezoelectric element. A frictional engagement member capable of moving along the driving frictional member is mounted on the circumferential surface of the driving frictional member by being inserted thereon. The lens serving as a driven member is attached thereto through the frictional engagement member.

The frictional engagement member has a slider that has a through-hole, through which the driving frictional member is inserted, and also has a frictional member pressed against the circumferential surface of the driving frictional member exposed from a concave portion of the slide, and a plate spring adapted to press the frictional member. The frictional engagement member is engaged with the driving frictional member by fixing the plate spring with screws to a desired frictional force.

In such a driving device, the piezoelectric element is expanded or contracted by applying a pulse-like voltage to the piezoelectric element. Thus, the driving frictional member moves. In a case where the piezoelectric element deforms at a low rate, the frictional engagement member moves together with the driving frictional member. In a case where the piezoelectric element deforms at a high rate, the frictional engagement member remains located at the same position due to inertia of the masses of the frictional engagement member and the driven member, whereas the driving frictional member moves. Therefore, the frictional engagement member frictionally engaged with the driving frictional member intermittently moves with fine pitches. Thus, the lens attached to the frictional engagement member can be moved (see, for example, JP-A-2002-142470).

However, according to related art described in JP-A-2002-142470, a frictional engagement member includes a plurality of components. Thus, it is difficult to generate a desired frictional force. Accordingly, there has been a demand for a driving device enabled to drive a driven member with a simple configuration.

Also, in a case where a piezoelectric element deforms at a high rate in a related driving device, a frictional engagement member is somewhat pulled back together with a driving member, so that sometimes, vibrations of the piezoelectric element are not reliably transmitted.

SUMMARY OF THE INVENTION

The invention is accomplished to solve such a problem. An object of the invention is to provide a driving device enabled to enhance driving performance with a simple configuration including an electromechanical conversion element.

According to the invention, there is provided a driving device comprising: an electro-mechanical conversion element enabled to expand and contract in response to input of an electrical signal; a pair of clamping members that come closer to and move away from each other with expansion and contraction of the electro-mechanical conversion element; a moving member disposed between said pair of clamping members; and flagellar members which are provided between the moving member and each of said pair of clamping members to be inclined to a direction in which said pair of clamping members come closer to and move away from each other, and which are adapted to swing when said pair of clamping members come closer to and move away from each other, to cause the moving member to move in a constant direction.

This driving device has the swingable flagellar members which are provided between the moving member and each of the pair of clamping members to be inclined to a direction in which the pair of clamping members come closer to and move away from each other. Thus, when the pair of clamping members come closer to and move away from each other, the flagellar members are pushed by the pair of clamping members across the moving member to swing and push out the moving member to move in a constant direction. Consequently, the moving member surely moves with the expansion/contraction of the electromechanical conversion element. Thus, the driving performance of the driving device can be enhanced. Also, the driving device of the invention need not have the frictional engagement member that is provided in the related driving device. Thus, the number of components can be reduced. Consequently, the cost of the device can be reduced. Incidentally, the swing includes a motion in a case where a base-end side of the flagellar member is fixed, and where a tip-side part of the flagellar member is bent and is inclined more largely than the base-end side thereof.

Also, the driving device of the invention may include a pressing section that presses the moving member in an opposite direction to the constant direction and moves the moving member in the opposite direction when the pair of clamping members are apart from each other at a distance that is equal to or more than a predetermined value.

DETAILED DESCRIPTION OF THE INVENTION

Figure 1:
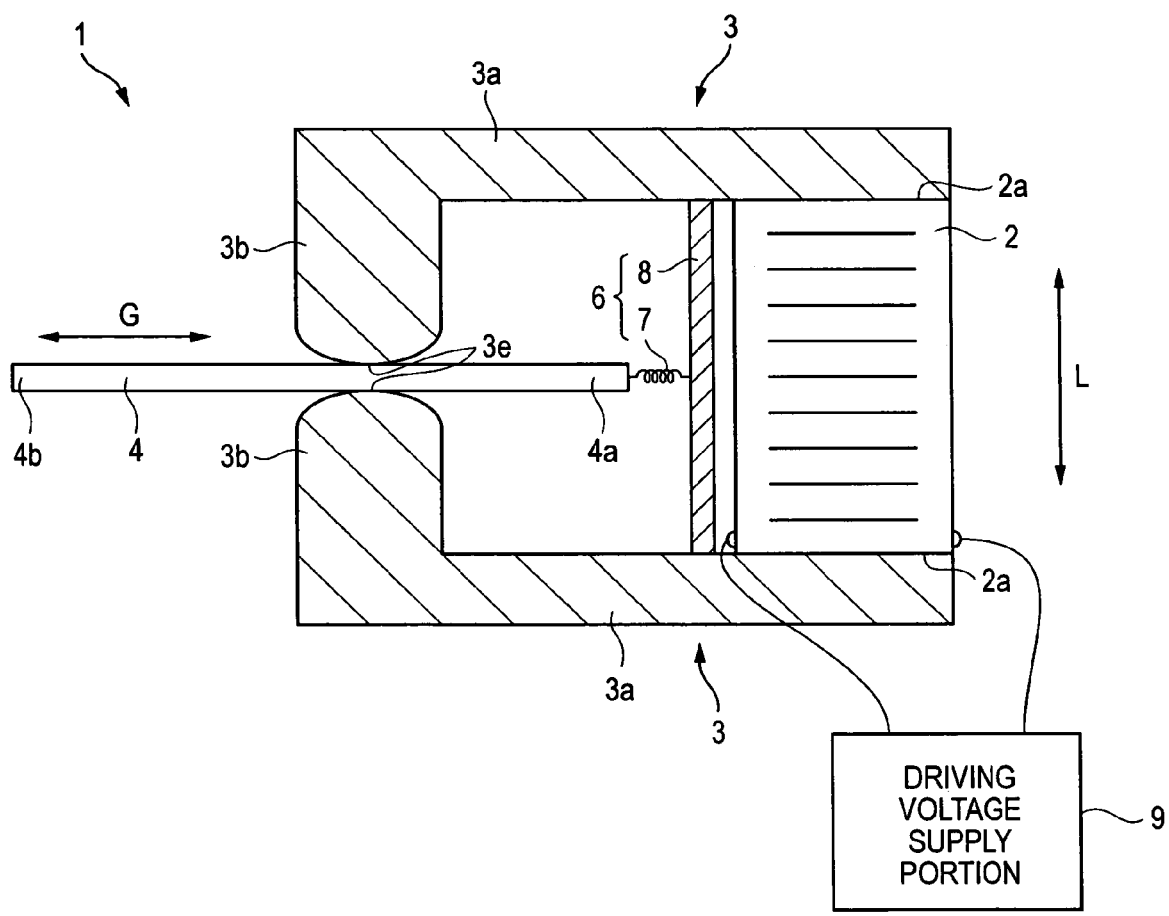
FIG. 1 is a longitudinally cross-sectional view illustrating a driving device according to a first embodiment of the invention.
Figure 2:
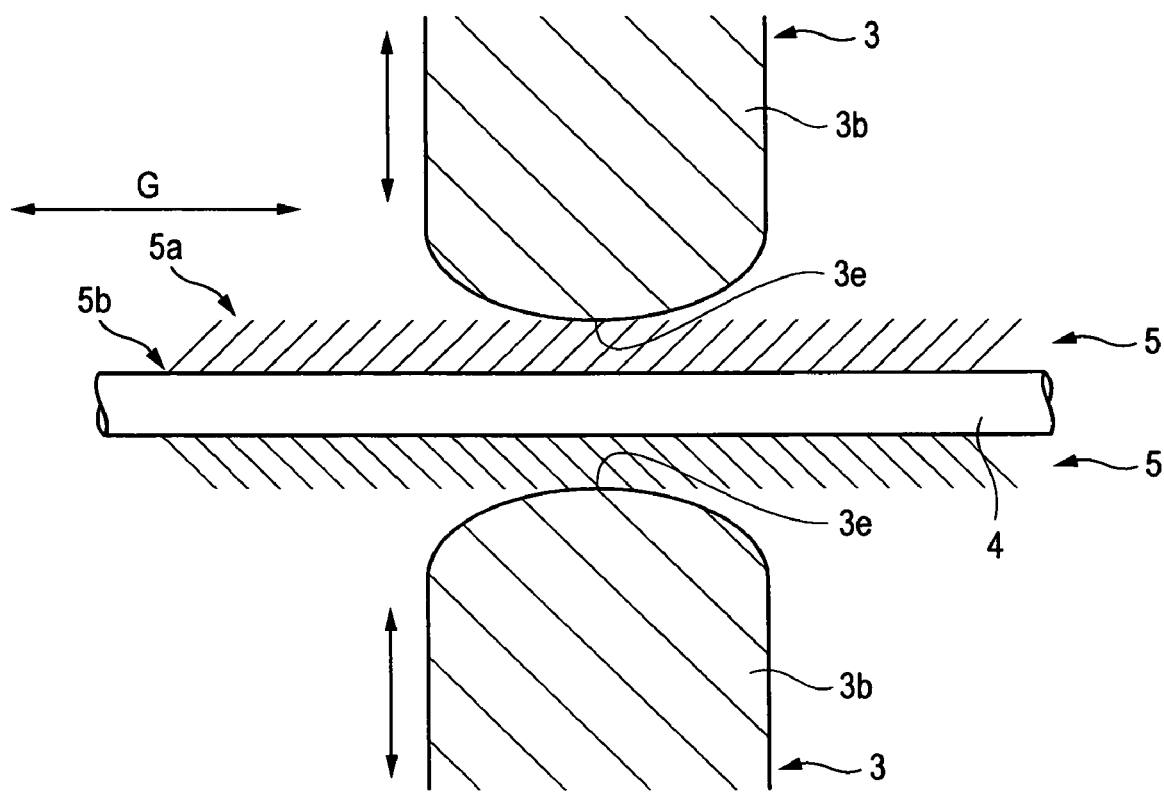
FIG. 2 is an enlarged cross-sectional view illustrating flagellar members provided in a moving member shown in FIG. 1.

Hereinafter, preferred embodiments of the driving device of the invention are described with reference to the accompanying drawings. Additionally, in the drawings, same reference numerals designate same or corresponding components. The redundant description of such components is omitted. FIG. 1 is a longitudinally cross-sectional view illustrating a driving device according to a first embodiment of the invention. FIG. 2 is an enlarged cross-sectional view illustrating flagellar members provided in the moving member shown in FIG. 1.

A driving device 1 shown in FIG. 1 drives a lens of a camera phone. The driving device 1 has, for example, a rectangular-column-like piezoelectric element (electro-mechanical conversion element) 2, a pair of clamping members 3, 3, which are disposed on both sides in the longitudinal direction (up-down direction, as viewed in FIG. 1) of the piezoelectric element 2 and extend in a direction perpendicular to the piezoelectric element 2, and a driving shaft (corresponding to the moving member) 4 extending in substantially parallel to the clamping members 3 between the pair of clamping members 3, 3. The driving shaft 4 moves in a direction (lateral direction, as viewed in FIG. 1) G, in which the driving shaft 4 extends, and drives a lens (not shown) connected to the driving shaft 4.

The piezoelectric element 2 having layers laminated in the longitudinal direction L is electrically connected to a driving voltage supply portion 9. A positive voltage is applied by the driving voltage supply portion 9 to the piezoelectric element 2 thereby to cause the driving voltage supply portion 9 to expand in a laminating direction (that is, the longitudinal direction L). Thus, the piezoelectric element 2 expands and contracts (or deforms) to thereby displace both end surfaces 2a, 2a in the longitudinal direction L thereof.

Each of the clamping members 3 is L-shaped so that a longer side portion 3a extends in the driving direction G of the driving shaft 4, and that a shorter side portion (protruding portion) 3b protrudes inwardly and extends toward the driving shaft 4. The shorter side portion 3b of each of the clamping members 3 has an end surface 3e (surface facing the moving member) at the side of the driving shaft 4, which is shaped as a curved surface so as to sandwich the driving shaft 4. Also, the shorter side portions 3b of the clamping members 3 and the piezoelectric element 2 are spaced from each other in the direction G, in which the driving shaft 4 extends, and define a predetermined space. End surfaces 2a of the piezoelectric element 2 are bonded to the inner surfaces of longer side portions 3a of the pair of clamping members 3, respectively. Each of the clamping members 3 is provided with a guide mechanism (not shown) adapted to guide a motion of the longer side portion 3a in an up-down direction, as viewed in FIG. 1. When vibrations of the piezoelectric element 2 are transmitted to the pair of clamping members 3, the motions of the pair of clamping members 3 are guided by the guide mechanism, so that the pair of clamping members 3 iteratively come close to and move away from each other.

The driving shaft 4 has one end portion 4a disposed between the piezoelectric element 2 and each of the shorter side portions 3b of the clamping members 3, and also has the other end portion 4b disposed outwardly from the shorter side portions 3b. Additionally, the driving shaft 4 is sandwiched by the clamping members 3 from above and below, respectively, as viewed in FIG. 1.

Also, a plurality of flagellar members extending in directions inclined to the driving direction G (that is, inclined to the direction in which the clamping members 3 come close to and move away from each other) are provided in parallel to one another between the circumferential surface (facing the clamping members) of the driving shaft 4 and each of the end surfaces 3e of the pair of clamping members 3, as shown in FIG. 2. More specifically, a plurality of flagellar members 5 are implanted into the circumferential surface of the driving shaft 4 over the substantially entire length of the driving shaft 4. The flagellar members 5 are linearly shaped and have predetermined strength and flexibility. The plurality of flagellar members 5 extend in the substantially same direction inclined by a predetermined angle to the driving shaft 4. A tip end 5a of each of the flagellar members 5 is placed rearwardly (rightwardly, as viewed in FIG. 2) from a support point 5b. The plurality of flagellar members 5 are pressed by the shorter side portions 3b of the pair of clamping portions 3 to be swingable. That is, the flagellar members 5 swing by being pressed from above and below, as viewed in FIG. 2, by the end surfaces 3e of the shorter side portions 3b, which face the circumferential surface of the driving shaft 4. At that time, the driving shaft 4 is pushed out to a side (the right side, as viewed in FIG. 2) opposite to the piezoelectric element 2, and is moved in a constant direction.

As shown in FIG. 1, a pressing section 6, which is adapted to press and pull back the driving shaft when the pair of clamping members are apart from each other at a distance that is equal to or more than a predetermined value, is placed at the end portion 4a of the driving shaft 4, which is provided at the side of the piezoelectric element 2. The pressing section 6 includes a spring 7 adapted to pull the driving shaft 4 toward the piezoelectric element 2, and also includes a spring fixing member 8 adapted to fix the spring 7 to the pair of clamping members 3. The spring 7 extends in the driving direction G, in which the driving shaft 4 is driven, and has one end portion connected to the end portion 4a of the driving shaft 4 and also has the other end portion connected to the pair of clamping members 3 through the spring fixing member 8.

In such a driving device 1, a predetermined voltage is applied to the piezoelectric element 2 by the driving voltage supply portion 9 to thereby expand and contract the piezoelectric element in the longitudinal direction L. The pair of clamping members 3 are displaced in response to the expansion/contraction of the piezoelectric element 2 to come close to and move away from each other. The shorter side portions 3b of the pair of the clamping members 3 are adapted to move advanceably and retreatably with respect to the driving shaft (moving member) 4. When the shorter side portions 3b come close to the driving shaft 4 to thereby press the flagellar members 5 against the shorter side portions 3b, the ends 5a of the flagellar members 5 are inclined toward the driving shaft 4. Thus, the driving shaft 4 is pushed out to the side opposite to the piezoelectric element 2, and moves against a pull force of the pressing section 6. Subsequently, when the shorter side portions 3b are separated from the driving shaft 4, so that the pressing force applied to the flagellar members 5 is reduced, the end 5a of each of the flagellar members 5 moves toward the side opposite to the driving shaft 4 and returns to an initial position (that is, the position at which each of the ends 5a is placed before the flagellar members 5 are pressed). At that time, the position in the driving direction G of the driving shaft 4 is maintained. Then, the piezoelectric element 2 iteratively expands and contracts, so that the driving shaft 4 moves to the side opposite to the piezoelectric shaft 4. That is, the driving shaft 4 is sandwiched by the pair of clamping members 3 and is moved like a shaft of a single bristle grass plant (setaria) moved when grasped.

Also, when the shorter side portions 3b of the pair of clamping members 3 are moved away from each other by applying a voltage to the piezoelectric element 2, so that the pair of clamping members 3 are apart from each other at a distance that is equal to or larger than a predetermined value, the pressing forces of the shorter side portions 3b, which have been applied to the flagellar members 5, are cancelled. The moved driving shaft 4 is pulled by the pressing section 6, and is moved toward the side of the piezoelectric element 2 (that is, toward the right side, as viewed in FIG. 2). At that time, preferably, a voltage larger than a normal voltage applied to the piezoelectric element so as to cause the pair of clamping members 3 to come closer to and move away from each other is applied thereto.

According to such a driving device 1, the expansion and the contraction of the piezoelectric element 2 are transmitted to the pair of clamping members 3. Thus, the pair of clamping members 3 sandwich the driving shaft 4 from a direction perpendicular to the driving direction G, and press the flagellar members 5. Consequently, the flagellar members 5 swing and push out the driving shaft 4 in the driving direction G of the driving shaft 4. Consequently, the driving shaft 4 moves, so that the lens can be driven. Also, the vibrations of the piezoelectric element 2 are efficiently transmitted. Thus, the driving performance of the device can be enhanced. Additionally, the driving device according to the present embodiment need not have a frictional engagement member that is provided in the related driving device. Consequently, the configuration of the driving device according to the invention can be simplified. Thus, the number of components of the device can be reduced. The reliability of the device can be enhanced. The cost of the device can be reduced.

Also, the driving device is configured so that the longitudinal direction L of the piezoelectric element 2 is substantially perpendicular to the driving direction G of the driving shaft 4. Thus, as compared with the configuration of the related device, in which the piezoelectric element and the driving shaft are connected to each other in the same direction, the length in the longitudinal direction of the driving device 1 can be reduced. Consequently, space-saving can be achieved. Accordingly, the thickness of the camera phone, on which the driving device 1 is mounted, can be reduced.

Additionally, the driving device 1 has the pressing section 6. Thus, the driving shaft 4 is configured to be able to be reciprocatively moved by pulling back the moved driving shaft 4.

Figure 3:
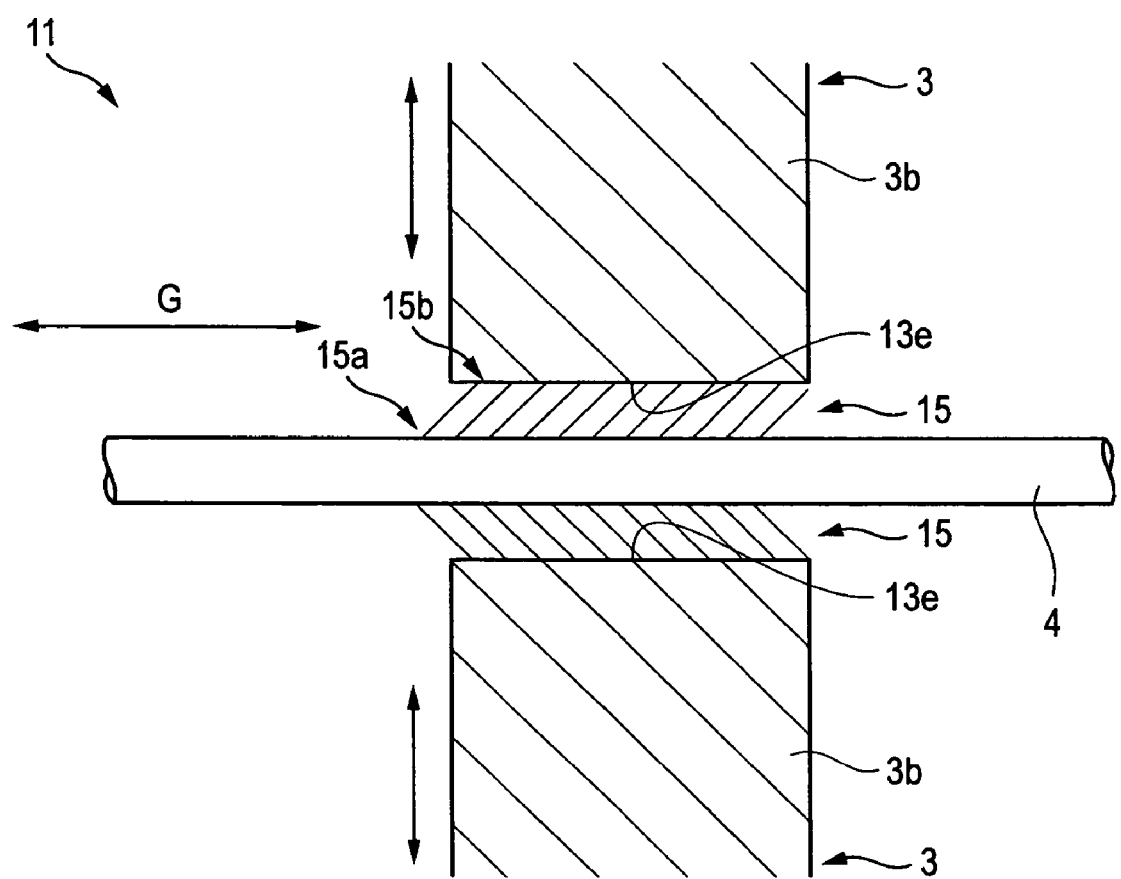
FIG. 3 is an enlarged cross-sectional view illustrating a flagellar member of a driving device according to a second embodiment of the invention.

Next, a driving device 11 according to a second embodiment of the invention is described below. FIG. 3 is an enlarged cross-sectional view illustrating a flagellar member of a driving device according to the second embodiment of the invention. The driving device 11 of the second embodiment differs from the driving device 1 of the first embodiment in that flagellar members 15 formed on end surfaces 13e of shorter side portions 3b of the pair of clamping members 3 are provided in the driving device 11, instead of the flagellar members 5 formed on the circumferential surface of the driving shaft 4. The end surfaces 13e of the pair of the clamping members 3 are formed as surfaces that are substantially parallel to the circumferential surface of the driving shaft 4.

The plurality of flagellar members 15 are implanted into the end surfaces 13e of the clamping members 3 to extend in directions inclined to the driving direction G of the driving shaft 4. The flagellar members 15 are linearly shaped and have predetermined strength and flexibility. The plurality of flagellar members 15 extend in the substantially same direction inclined by a predetermined angle to the driving shaft 4. A tip end 15a of each of the flagellar members 15 is placed frontwardly (leftwardly, as viewed in FIG. 3) from a support point 15b. The plurality of flagellar members 15 are brought into contact with the circumferential surface of the driving shaft 4 and are put into a swingable condition by causing each of the short side portions 3b of the pair of clamping members 3 to come close to the driving shaft 4. At that time, the driving shaft 4 is sandwiched by the flagellar members 15 from above and below, as viewed in FIG. 3, and is pushed out to a side opposite to the piezoelectric element 2.

With such a configuration, the driving device 11 of the second embodiment has advantages similar to those of the driving device 1 of the first embodiment. Additionally, according to the second embodiment, the flagellar members 15 are formed on the end surfaces 13e of the clamping members 3. Thus, there is no need for providing the flagellar members over the entire length of the driving shaft 4. Consequently, the area of a space required to provide the flagellar members 15 can be reduced.

In the foregoing description, the invention has specifically be described with reference to the embodiments. However, the invention is not limited thereto. The above embodiments are configured to have the driving shaft 4 as the moving member. However, the moving member may be, for example, either a rectangular-column-like moving member or a plate-like moving member. In the case of employing the plate-like moving member, the moving member is sandwiched by the clamping members from both sides in the direction of a thickness of the plate.

Also, the flagellar members according to the invention are not limited to linear (or capillary) ones. Swingable plate-like members may be used as the flagellar members. That is, any flagellar member may be employed, as long as the flagellar member swings, pushes out and drives the driving shaft 4 when the pair of clamping members 3 are made to come closer to the driving shaft 4.

In the foregoing description of the embodiments, the driving devices have been described as those adapted to drive the lens. However, the driving device according to the invention may drive other driven members.

Additionally, in the above embodiments, an electro-mechanical conversion element is employed as the piezoelectric element 2. However, other electromechanical conversion elements may be used as the piezoelectric element 2. That is, any electro-mechanical conversion elements may be employed, as long as the electromechanical conversion elements can expand and contract in response to the input of an electric signal thereto.

According to the driving device of the invention, the moving member surely moves with expansion/contraction of the electro-mechanical conversion element. Thus, the invention can provide a driving device enabled to enhance driving performance with a simple configuration having an electro-mechanical conversion element. Also, because of the configuration that does not have a frictional engagement member which is provided in the related driving device, the device of the invention can reduce the number of components and the cost thereof.

The entire disclosure of each and every foreign patent application from which the benefit of foreign priority has been claimed in the present application is incorporated herein by reference, as if fully set forth.

What is claimed is:

1. A driving device comprising:
   an electro-mechanical conversion element enabled to expand and contract in response to input of an electrical signal;
   a pair of clamping members that come closer to and move away from each other with expansion and contraction of the electro-mechanical conversion element;
   a moving member disposed between said pair of clamping members; and
   flagellar members which are provided between the moving member and each of said pair of clamping members to be inclined to a direction in which said pair of clamping members come closer to and move away from each other, and which are adapted to swing when said pair of clamping members come closer to and move away from each other, to cause the moving member to move in a constant direction.

2. The driving device according to claim 1, further comprising a pressing section that presses the moving member in an opposite direction to the constant direction and moves the moving member in the opposite direction when said pair of clamping members are apart from each other at a distance that is equal to or more than a predetermined value.

3. The driving device of claim 1, wherein said flagellar members are attached to said moving member.

4. The driving device of claim 1, wherein said flagellar members are attached to said clamping members.

5. The driving device of claim 1, wherein said moving member is rod-shaped.

6. The driving device of claim 5, wherein said moving member has a rectangular cross-section.

7. The driving device of claim 5, wherein said moving member has a circular cross-section.

8. The driving device of claim 1, wherein an object to be moved is attached to the end of said moving member.

9. The driving device of claim 8, wherein said object to be moved is a lens.

10. The driving device of claim 1, wherein said device is disposed inside of a mobile communication device.

11. The driving device of claim 1, wherein said device is disposed inside of a camera.

12. The driving device of claim 1, wherein the moving member moves in a direction perpendicular to the direction of the expansion and contraction of the electro-mechanical conversion element.

13. The driving device of claim 1, wherein the ends of the clamping members that contact the flagellar members are flat in shape.

14. The driving device of claim 1, wherein the ends of the clamping members that contact the flagellar members are semi-circular in shape.

15. A method of moving an object in a direction comprising:
    activating an electro-mechanical conversion element enabled to expand and contract in response to input of an electrical signal;
    moving a pair of clamping members that come closer to and move away from each other with expansion and contraction of the electro-mechanical conversion element;
    compressing flagellar members which are provided between each of said pair of clamping members and a moving member disposed between said pair of clamping members, said flagellar members being inclined to a direction in which said pair of clamping members come closer to and move away from each other, and which are adapted to swing when said pair of clamping members come closer to and move away from each other, to cause the moving member to move in a constant direction.

16. The method of claim 15, said method further comprising pulling the moving member in a direction opposite to the direction of movement created when the flagellar members are compressed, when said pair of clamping members are moving apart from each-other.

17. The method of claim 15, wherein said method is used to move an object disposed inside a mobile communication device.

18. The method of claim 15, wherein said object is a lens in a camera.

19. The method of claim 15, wherein said compressing flagellar members causes said moving member to move in a direction perpendicular to the direction of contraction and expansion of the clamping members by translating a portion of the movement of said clamping members into a perpendicular direction to impel said moving member in said perpendicular direction.

20. The method of claim 15, wherein said moving member comprises a rod.

* * * * *